US012781066B2

(12) United States Patent
Tsutsui et al.

(10) Patent No.: US 12,781,066 B2
(45) Date of Patent: Nov. 3, 2026

(54) COATING FILM AND COATED ARTICLE

(71) Applicant: NISSAN MOTOR CO., LTD., Yokohama (JP)

(72) Inventors: Hironori Tsutsui, Kanagawa (JP); Tatsuya Suzuki, Kanagawa (JP); Cheetuck Ho, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 387 days.

(21) Appl. No.: 18/292,015

(22) PCT Filed: Jul. 30, 2021

(86) PCT No.: PCT/JP2021/028294
§ 371 (c)(1),
(2) Date: Jan. 25, 2024

(87) PCT Pub. No.: WO2023/007697
PCT Pub. Date: Feb. 2, 2023

(65) Prior Publication Data

US 2024/0336788 A1 Oct. 10, 2024

(51) Int. Cl.
*C09D 7/61* (2018.01)
*C09D 7/40* (2018.01)

(52) U.S. Cl.
CPC .................................... *C09D 7/61* (2018.01); *C09D 7/70* (2018.01)

(58) Field of Classification Search
CPC ... C09D 7/70; C09D 7/61; B05D 1/36; B05D 5/06; B05D 5/065; B05D 5/066; B05D 5/067; B05D 5/068
See application file for complete search history.

(56) References Cited

U.S. PATENT DOCUMENTS 4,921,755 A * 5/1990 Carroll, Jr. ............ B05D 5/068 524/439
2019/0054498 A1 2/2019 Yamane et al.

FOREIGN PATENT DOCUMENTS

| | | | | | |
|---|---|---|---|---|---|
| CN | 101633801 | A | | 1/2010 | |
| JP | 6 330 743 | B | * | 1/2017 | .............. B05D 1/36 |
| JP | 2019-123819 | A | | 7/2019 | |
| WO | WO-2017/146150 | A1 | | 8/2017 | |
| WO | WO-2019/131957 | A1 | | 7/2019 | |

* cited by examiner

*Primary Examiner* — Pegah Parvini
(74) *Attorney, Agent, or Firm* — Foley & Lardner LLP

(57) ABSTRACT

To provide a coating film having both metallic designability and electromagnetic wave permeability, and a coated article including the coating film.
A coating film 10 has a laminated structure including at least a basecoat layer 12 containing a plurality of substantially flat aluminum pieces serving as luster materials 12*a*, an area occupancy rate of the aluminum pieces in the basecoat layer 12 is more than 75% and 100% or less, an average length (average major diameter) of the aluminum pieces in a longitudinal direction on a flat surface is 9 μm or less, and a film thickness of the coating film 10 is more than 2 μm and less than 9 μm.

7 Claims, 2 Drawing Sheets

COATING FILM AND COATED ARTICLE

TECHNICAL FIELD

The present invention relates to a coating film having electromagnetic wave permeability such as millimeter waves, and a coated article including the coating film.

BACKGROUND ART

A vehicle body component constituting a vehicle is coated with a metallic pigment containing, as a luster material, aluminum pieces or the like having light reflectivity in order to enhance designability.

In recent years, research and practical application for automatic driving of vehicles have been advanced using a radar device using microwaves, millimeter waves, or the like capable of obtaining high resolution. Since this type of the radar device is installed on the rear side of a vehicle body component (such as a front bumper or a rear bumper) of a vehicle, the corresponding vehicle body component needs to have a low attenuation rate of electromagnetic waves.

In order to enhance designability by providing a metallic contrast feeling which is highly demanded in design, it is necessary to spread aluminum serving as a luster material on the vehicle body densely and in parallel. However, aluminum has a property that it is difficult for electromagnetic waves such as millimeter waves to be transmitted, and thus electromagnetic wave permeability is reduced. On the other hand, in order to improve the electromagnetic wave permeability, it is only required to reduce the aluminum content during metallic coating or to use a luster material other than aluminum, but the contrast feeling is deteriorated to reduce designability.

Patent Literature 1 below discloses a millimeter wave transmissive coating film in order to achieve both designability and electromagnetic wave permeability which are the problems described above.

CITATION LIST

Patent Literatures

Patent Literature 1: JP 2019-123819 A

SUMMARY OF INVENTION

Technical Problem

However, Patent Literature 1 discloses that, when the area occupancy rate of aluminum pieces (aluminum flakes) is set to 75% or more, electromagnetic wave permeability is rapidly deteriorated. That is, in the technique of Patent Literature 1, the area occupancy rate of aluminum pieces cannot be set to 75% or more in order to enhance metallic designability, and there is room for improvement. The technique of Patent Literature 1 is a coating technique mainly for an emblem, and a luster material (indium or aluminum) having a sea-island structure and an ultrathin film (1 μm or less) achieves both metallic feeling and radar transmission, but cannot be adopted for vehicle components such as bumpers from the viewpoint of quality.

Although it is conceivable to use a pigment (such as glass or mica) having a low dielectric constant other than aluminum as a luster material, the electromagnetic wave permeability is solved, but the designability is inevitably deteriorated.

As described above, in metallic coating, it is not easy to achieve both metallic designability and electromagnetic wave permeability, which are in a contradictory relationship, and achieving both of these performances is an important problem in realizing next-generation metallic coating.

At least one embodiment of the present invention has been made in view of the above circumstances, and specifically provides a coating film having both metallic designability and electromagnetic wave permeability and a coated article including the coating film.

Solution to Problem

A coating film according to the present embodiment is a coating film having a laminated structure including at least a basecoat layer containing a plurality of substantially flat aluminum pieces, in which an area occupancy rate of the aluminum pieces is more than 75% and 100% or less, an average length of the aluminum pieces in a longitudinal direction on a flat surface is 9 μm or less, and a film thickness of the coating film is more than 2 μm and less than 9 μm.

A coated article according to the present embodiment includes the above-described coating film and a substrate made of a resin material and having the coating film formed on an outer surface.

Effect of the Invention

According to at least one embodiment of the present invention, it is possible to provide a novel coating film having both metallic designability and electromagnetic wave permeability, and a coated article.

DESCRIPTION OF EMBODIMENTS

Figure 1:
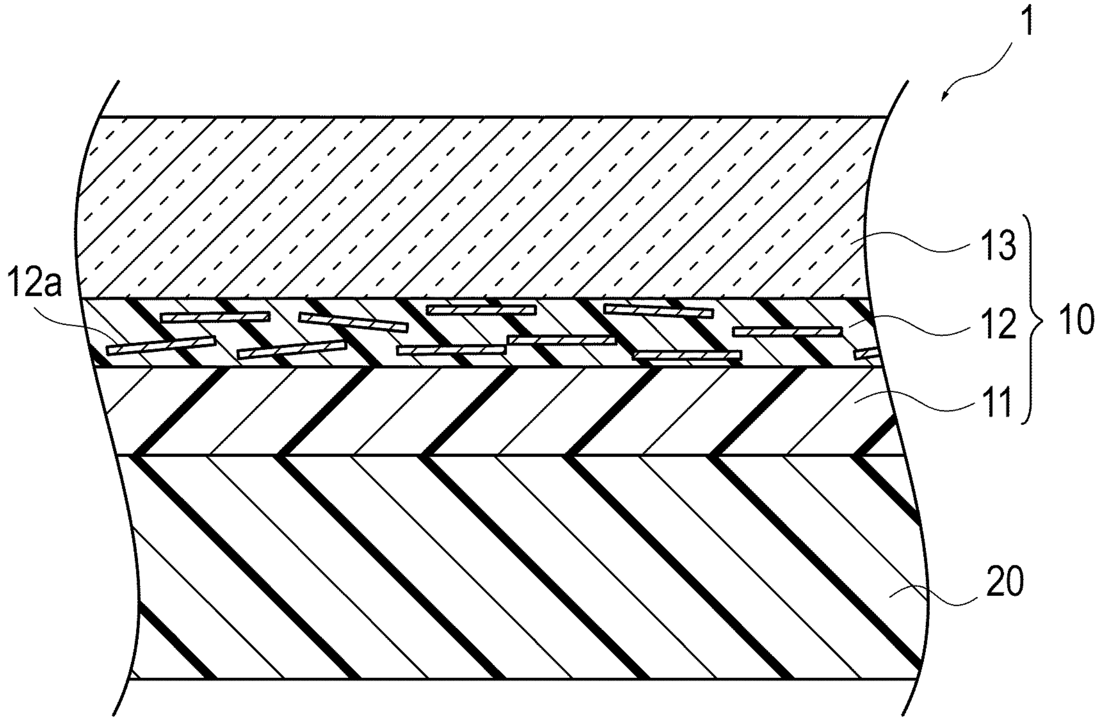
FIG. 1 is a schematic configuration diagram illustrating a layer structure of a coating film according to the present embodiment.

Hereinafter, embodiments for carrying out the present invention will be described in detail with reference to the drawings. The embodiments illustrated herein are set forth to embody technical idea of the present invention and do not limit the present invention. Other embodiments, examples, operation techniques, and the like that can be implemented by those skilled in the art without departing from the gist of the present invention are all included in the scope and gist of the present invention and are encompassed in the invention described in the claims and the scope of equivalents thereof.

In the drawings attached to the present specification, scale, aspect ratio, shape, and the like may be changed from those of an actual article as appropriate, and they are only schematically shown for the purpose of convenience in illustrating and in providing a better understanding. That is, the drawings are illustrative only and are not intended to limit the interpretation of the present invention.

As illustrated in FIG. 1, a coated article 1 according to the present embodiment includes a coating film 10 and a substrate 20 which is an object to be coated having the coating film 10 formed on an outer surface.

Coating Film

The coating film 10 has a laminated structure including at least a primer layer 11, a basecoat layer 12, and a topcoat layer 13. The coating film 10 is formed by applying the primer layer 11, the basecoat layer 12, and the topcoat layer 13 once or a plurality of times, respectively. The coating film 10 preferably includes only the basecoat layer 12 as a metal-containing layer in order to realize electromagnetic wave permeability.

The coating film 10 is not limited to the laminated structure illustrated in FIG. 1, and may be appropriately changed according to the application of the component. That is, the coating film 10 may include other functional layers in addition to the primer layer 11, the basecoat layer 12, and the topcoat layer 13.

The primer layer 11 is formed on the outer surface (coated surface) of the substrate 20. The primer layer 11 is a layer for improving adhesion between the basecoat layer 12 and the substrate 20. As a material for the primer layer 11, for example, a known resin coating material for a primer can be adopted. As the resin coating material, for example, resinous coating materials such as a modified polyolefin resin, a polyester-based resin, a urethane-based resin, an epoxy-based resin, a melamine-based resin, an alkyd-based resin, a phenol-based resin, and an acryl-based resin can be adopted. The primer layer 11 may appropriately contain a known additive in addition to the resin material.

The basecoat layer 12 is formed on the outer surface (coated surface) of the primer layer 11. The basecoat layer 12 includes a resin material, a solvent, and a pigment (luster material). In addition to these materials, the basecoat layer 12 may contain, for example, an organic pigment, an inorganic pigment, a material other than aluminum pieces 12*a* functioning as a luster material (such as mica or glass), an ultraviolet absorber, a radical trap agent, and the like as necessary.

As the resin material of the basecoat layer 12, a known resin material generally used in the coating material field can be applied. As the resin material, for example, a polyester-based resin, a urethane-based resin, an epoxy-based resin, a melamine-based resin, an alkyd-based resin, a phenol-based resin, and an acryl-based resin, and the like can be adopted.

As the solvent, a known organic solvent or water-soluble agent (such as water) generally used in the coating material field can be applied. Examples of the organic solvent include hydrocarbons such as toluene and xylene, ketones such as acetone, methyl ketone, and methyl ethyl ketone, esters such as ethyl acetate and butyl acetate, and alcohols.

The pigment includes the aluminum pieces 12*a* functioning as a luster material. The aluminum pieces 12*a* have a substantially flat shape (also including, for example, a shape referred to as a flake shape, a scale shape, a plate shape, a thin-layer shape, or the like) that is non-spherical. The term "flat" means a shape in which a major diameter in a width direction orthogonal to a thickness direction of the flat portion (a length in a major axis direction of an equivalent circle diameter of a "flat surface" in which a projected area of the flat portion is maximum) is longer than a length in the thickness direction.

The basecoat layer 12 is formed by mixing a pigment with a resin material and a solvent, and then volatilizing the solvent in a drying step to be volume-shrunk. As a result, the orientation of the aluminum pieces 12*a* is enhanced, and the flat surface of the aluminum piece 12*a* can be arranged substantially parallel to the coated surface with respect to the surface of the basecoat layer 12. Therefore, in the coating film 10, specular reflectance of reflected light and interference light is increased, and higher luminance feeling and contrast feeling can be obtained.

In the basecoat layer 12, an area occupancy rate of the aluminum pieces 12*a* is more than 75% and 100% or less, an average length of the aluminum pieces 12*a* in a longitudinal direction on a flat surface (hereinafter, also simply referred to as "average major diameter") is 9 μm or less, and a film thickness is more than 2 μm and less than 9 μm.

In the coating film 10, when the area occupancy rate of the aluminum pieces 12*a* is 75% or less, the base is not hidden, so that contrast feeling cannot be obtained and designability is deteriorated. In the coating film 10, when the average major diameter of the aluminum pieces 12*a* is more than 9 μm, the aluminum pieces 12*a* adjacent to each other in the basecoat layer 12 easily come into contact with each other. Since a contact point between the aluminum pieces 12*a* acts as a dielectric, the dielectric constant increases, and the electromagnetic wave permeability decreases. In the coating film 10, when the film thickness is 2 μm or less, the lower layer (the primer layer 11 or the substrate 20) is seen through and the designability is deteriorated, and when the film thickness is 9 μm or more, the orientation of the aluminum pieces 12*a* is deteriorated, so that contrast feeling is not obtained and the designability is deteriorated.

On the other hand, in the coating film 10 according to the present embodiment, when the basecoat layer 12 satisfies the above conditions, as illustrated in FIG. 1, the flat surface of the aluminum piece 12*a* in the basecoat layer 12 is substantially parallel to the coated surface, and is disposed so as to suppress contact with another adjacent aluminum piece 12*a* and generate a gap therebetween. That is, in the basecoat layer 12, when the above conditions are satisfied, the orientation of the aluminum pieces 12*a* can be controlled, and both metallic designability and electromagnetic wave permeability can be achieved. Therefore, in the coating film 10, the orientation of the aluminum pieces 12*a* necessary for obtaining metallic contrast feeling and the appropriate film thickness are secured, and the metallic designability is improved. As illustrated in FIG. 1, in the basecoat layer 12, contact between the aluminum pieces 12*a* adjacent to each other is reduced. Therefore, in the coating film 10, the attenuation rate of electromagnetic waves is suppressed to be low, and electromagnetic wave permeability is excellent. As described above, the coating film 10 according to the present embodiment can achieve both metallic designability and electromagnetic wave permeability that have been difficult to achieve in the prior art.

In the coating film 10 according to the present embodiment, in the basecoat layer 12, a content ratio of the pigment (aluminum pieces 12*a*) to the resin material in the layer (P/B: pigment (aluminum pieces)/resin material) is preferably 45% or less from the viewpoint of improving electromagnetic wave permeability and metallic designability.

In the coating film 10, when the content ratio of the aluminum pieces 12*a* to the resin material in the basecoat layer 12 is more than 45%, the gap between the aluminum pieces 12*a* adjacent to each other in the basecoat layer 12 is narrowed and the aluminum pieces 12*a* easily come into contact with each other, so that the contact point between the aluminum pieces 12*a* acts as a dielectric to increase the attenuation rate. However, in the coating film 10, when the content ratio of the aluminum pieces 12*a* to the resin material in the basecoat layer 12 is 45% or less, the gap between the aluminum pieces 12*a* adjacent to each other in the basecoat layer 12 is appropriately secured. Therefore, in the coating film 10, a contact point between the aluminum pieces 12*a* is hardly formed, and the effect of improving electromagnetic wave permeability while securing metallic designability is obtained.

In the coating film 10 according to the present embodiment, in the basecoat layer 12, the area occupancy rate of the aluminum pieces 12*a* may be preferably 99.5% or less and more preferably 77% or more and 89.9% or less from the viewpoint of improving electromagnetic wave permeability and metallic designability.

In the coating film 10, by setting the area occupancy rate of the aluminum pieces 12*a* to 99.5% or less and more preferably 77% or more and 89.9% or less, the orientation of the aluminum pieces 12*a* can be enhanced in a state where the contact points between the aluminum pieces 12*a* adjacent to each other are spaced apart as little as possible. Therefore, in the coating film 10, the contrast feeling is further enhanced, the metallic designability is improved, and the electromagnetic wave permeability can be further improved. As the area occupancy rate of the aluminum pieces 12*a* decreases, the contact probability between the aluminum pieces 12*a* adjacent to each other decreases, so that the effect of improving electromagnetic wave permeability is easily obtained.

In the coating film 10 according to the present embodiment, the film thickness of the basecoat layer 12 may be set to 6 μm or less and preferably 4 μm or less from the viewpoint of improving electromagnetic wave permeability and metallic designability.

In the coating film 10, by setting the film thickness of the basecoat layer 12 to 6 μm or less and preferably 4 μm or less, the orientation of the aluminum pieces 12*a* is further improved, and the electromagnetic wave permeability can be improved while excellent metallic designability is maintained.

In the coating film 10 according to the present embodiment, in the basecoat layer 12, from the viewpoint of improving liquid feeling (dense feeling) without feeling the particle feeling of the pigment (aluminum pieces 12*a*), the average major diameter of the aluminum pieces 12*a* is set to 8 μm or more and 9 μm or less, and from the viewpoint of achieving both metallic designability and electromagnetic wave permeability, the average thickness of the aluminum pieces 12*a* is set to preferably 0.1 μm or more and 0.7 μm or less and more preferably 0.1 μm or more and 0.5 μm or less. The average thickness of the aluminum pieces 12*a* is set to preferably more than 0.2 μm from the viewpoint of suppressing deformation of the pigment (aluminum pieces 12*a*) circulated by receiving pressure in a coating material pipe. The average thickness of the aluminum pieces 12*a* may be set to preferably 0.25 μm or more, more preferably 0.3 μm or more, further preferably 0.35 μm or more, and still more preferably 0.4 μm or more, from the viewpoint of further enhancing the effect of suppressing the deformation of the pigment by circulation.

When the average thickness of the aluminum pieces 12*a* is less than 0.1 μm, the rigidity of the aluminum pieces 12*a* is lowered to be easily deformed, and the number of overlapped aluminum pieces 12*a* in the thickness direction of the basecoat layer 12 is increased, so that the number of contact portions between the aluminum pieces 12*a* adjacent to each other is increased, the dielectric constant is increased, and the electromagnetic wave permeability tends to be reduced. When the average thickness of the aluminum pieces 12*a* is more than 0.7 μm, the movement of the aluminum pieces 12*a* is suppressed, so that high orientation due to volume shrinkage cannot be enjoyed in the process from coating to film formation, and the metallic design is further deteriorated. Therefore, the average thickness of the aluminum pieces 12*a* is set to preferably 0.5 μm or less from the viewpoint of metallic designability due to high aluminum orientation.

In the coating film 10, by setting the average major diameter of the aluminum pieces 12*a* to 8 μm or more and 9 μm or less and the average thickness of the aluminum pieces 12*a* to 0.1 μm or more and 0.5 μm or less, it is possible to improve the electromagnetic wave permeability while maintaining dense and excellent metallic designability without feeling the particle feeling of the aluminum pieces 12*a*. In the coating film 10, by adjusting the average thickness of the aluminum pieces 12*a* to more than 0.2 μm, the deformation of the pigment at the time of stirring the coating material is effectively suppressed, the contact between the aluminum pieces 12*a* adjacent to each other is suppressed to prevent an increase in attenuation rate, and the electromagnetic wave permeability can be further improved.

The topcoat layer 13 is formed on the outer surface (coated surface) of the basecoat layer 12. The topcoat layer 13 is a layer for imparting weather resistance, glossiness, scratch resistance, and antifouling property to the coated article 1. As the topcoat layer 13, a conventionally known transparent resin material (regardless of colored or colorless) having the above performance can be used. The topcoat layer 13 may contain, for example, a fluororesin. To the topcoat layer 13, a weather-resistant agent, a plasticizer, a stabilizer, a stabilizer, a dispersant, a dye, a pigment, a solvent, and the like may be appropriately added as necessary.

Substrate

The substrate 20 is made of a material that hardly adversely affects electromagnetic wave permeability and is excellent in impact resistance and weather resistance, and the coating film 10 is formed on the outer surface of the substrate 20. As a constituent material for the substrate 20, a synthetic resin material is suitable, and examples thereof include various synthetic resin materials including thermoplastic resins such as general-purpose plastics (polypropylene (PP), polyvinyl chloride (PVC), an acrylic resin (PMMA), an acrylonitrile-butadiene-styrene resin (ABS), and the like) and engineering plastics (polycarbonate (PC) and the like). These synthetic resin materials can be appropriately selected according to the application of the coated article 1. When a resin material is adopted for the substrate 20, in consideration of the influence on the electromagnetic wave permeability of the coating film 10 in the coated article 1, it is preferable to adopt a material that does not contain a metal or has a metal content to such an extent that the electromagnetic wave permeability is not adversely affected.

The method for forming (coating) the coating film 10 on the substrate 20 is not particularly limited, and examples thereof include known coating methods (for example, a dipping method, a spin coating method, a flow coating method, a roll coating method, a spray coating method, a blade coating method, and an air knife coating method), and the like. As for the coating film 10, these coating methods can be appropriately selected according to the shape and use of the coated article 1, the composition of the coating film 10 and the substrate 20, and the like and then carried out.

The drying step of the coating film 10 can be carried out by appropriately selecting natural drying, forced drying, or the like.

In the present embodiment, the coated article 1 has a configuration including the above-described coating film 10 on the outer surface of the substrate 20. Since the coated article 1 includes the coating film 10, the coated article 1 is excellent in electromagnetic wave permeability in addition to metallic designability. For this reason, the coated article 1 can be suitably used as a constituent material for a vehicle body component requiring metallic designability and electromagnetic wave permeability, such as a bumper disposed at a position facing a transceiver 110 of a radar device 100 transceiving an electromagnetic wave of a predetermined wavelength such as a millimeter wave. The radar device 100 is a device that transmits an electromagnetic wave (transmission wave W1) of a predetermined wavelength such as a millimeter wave to an object X to be sensed (for example, a vehicle, an obstacle, or the like traveling around the own vehicle), and receives a reflected wave W2 thereof to measure a physical quantity (such as moving speed or distance from the object) related to the object X to be sensed.

Figure 2:
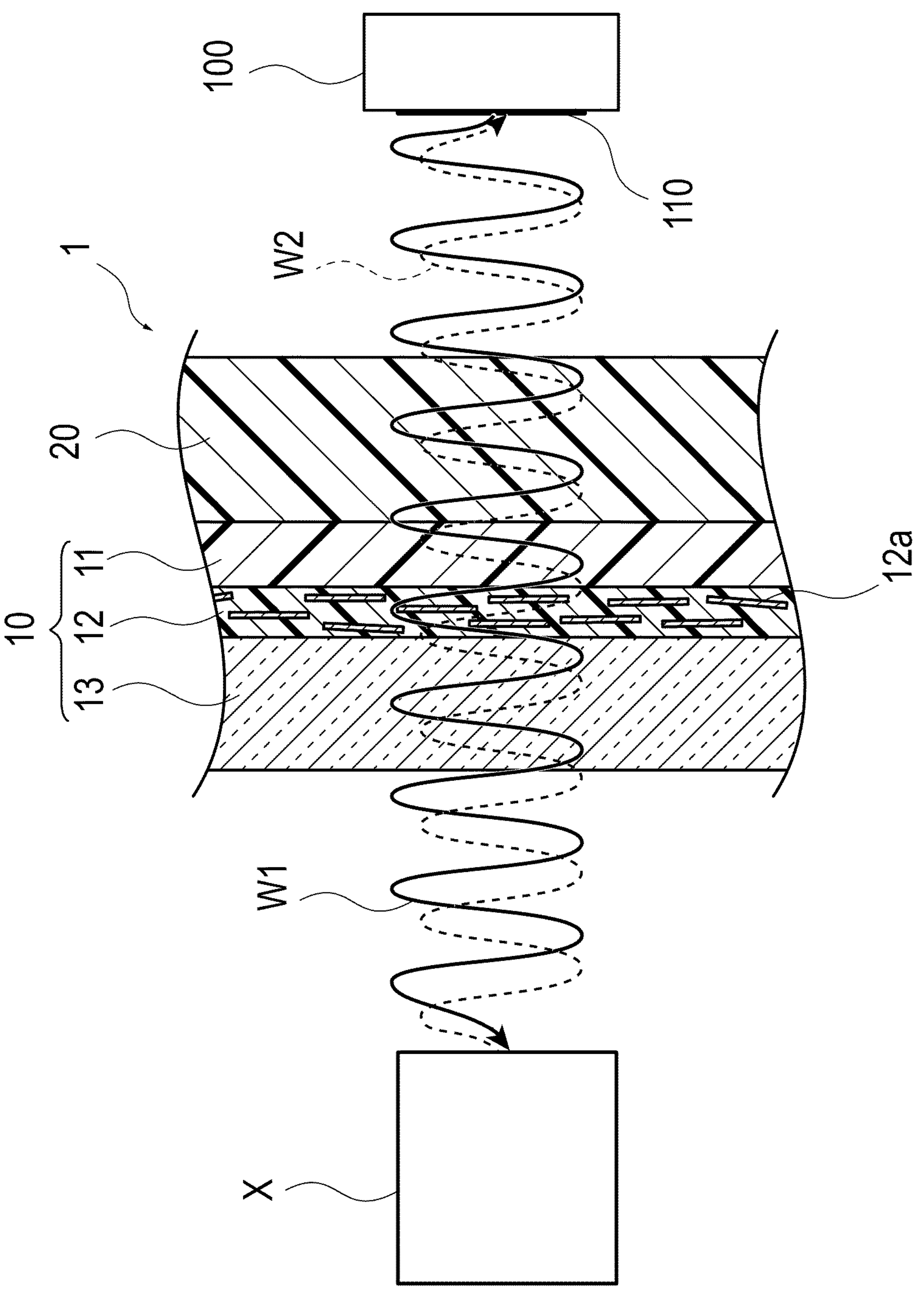
FIG. 2 is a schematic configuration diagram illustrating a use example of a coated article including the coating film according to the present embodiment.

FIG. 2 is a diagram schematically illustrating a part of a vehicle including a bumper, which is the coated article 1 according to the present embodiment, and the radar device 100. As illustrated in FIG. 2, the aluminum piece 12*a* in the basecoat layer 12 of the coating film 10 is prevented from coming into contact with another adjacent aluminum piece 12*a*, and an appropriate gap is formed. The transmission wave W1, which is an electromagnetic wave transmitted from the transceiver 110 of the radar device 100, is transmitted toward the object X to be sensed, passes through the substrate 20, passes between the aluminum pieces 12*a*, and reaches the object X to be sensed. The transmission wave W1 that has reached the object X to be sensed becomes the reflected wave W2 and returns to the radar device 100 again. At this time, the reflected wave W2 passes between the aluminum pieces 12*a* of the basecoat layer 12, passes through the substrate 20, and reaches the transceiver 110 of the radar device 100. As described above, the bumper as the coated article 1 can minimize the attenuation amount of the electromagnetic wave (transmission wave W1, reflected wave W2) transceived by the radar device 100 (attenuation rate of 3 dB or less at which the radar device 100 functions normally). Since the bumper as the coated article 1 includes the coating film 10, the bumper is excellent in metallic designability in addition to electromagnetic wave permeability.

The application of the coated article 1 is not particularly limited, and for example, when the coated article 1 is a vehicle body component, the coated article 1 can be applied to other vehicle body components requiring both metallic designability and electromagnetic wave permeability, in addition to the bumper described above. Since the coating film 10 having both metallic designability and electromagnetic wave permeability is formed on the outer surface of the substrate 20 made of a resin material, the coated article 1 can also be applied to, for example, components other than the vehicle body components requiring metallic designability and electromagnetic wave permeability for accommodating a device transceiving electromagnetic waves or for covering and protecting at least a part of the periphery of the device.

[Operation and Effect]

As described above, the coating film 10 according to the present embodiment has a laminated structure including at least the basecoat layer 12 containing a plurality of substantially flat aluminum pieces 12*a*, and is formed on the outer surface of the substrate 20. In the basecoat layer 12 of the coating film 10, the area occupancy rate of the aluminum pieces 12*a* is more than 75% and 100% or less, an average length of the aluminum pieces 12*a* in a longitudinal direction on a flat surface (average major diameter) is 9 μm or less, and a film thickness is more than 2 μm and less than 9 μm.

With such a configuration, the orientation of the aluminum pieces 12*a* in the basecoat layer 12 can be controlled such that the flat surface is substantially parallel to the layer surface, and the contact with another adjacent aluminum piece is suppressed to generate a gap therebetween, so that both metallic designability and electromagnetic wave permeability can be achieved.

In the coating film 10 according to the present embodiment, the content ratio of the aluminum pieces to the resin material in the basecoat layer may be set to 45% or less.

With such a configuration, the gap between the aluminum pieces 12*a* adjacent to each other in the basecoat layer 12 is appropriately secured, and a contact point between the aluminum pieces 12*a* is hardly formed, so that the effect of improving electromagnetic wave permeability while securing metallic designability is obtained.

In the coating film 10 according to the present embodiment, the area occupancy rate of the aluminum pieces may be set to preferably 99.5% or less, and more preferably 77% or more and 89.9% or less.

With such a configuration, in the coating film 10, the contrast feeling is further enhanced, the metallic designability is improved, and the orientation of the aluminum pieces 12*a* is enhanced so that the electromagnetic wave permeability can be improved.

In the coating film 10 according to the present embodiment, the film thickness may be preferably set to 4 μm or less.

With such a configuration, in the coating film 10, the orientation of the aluminum pieces 12*a* is further improved, and the effect of improving electromagnetic wave permeability while maintaining excellent metallic designability is exhibited.

In the coating film 10 according to the present embodiment, preferably, the average length (average major diameter) of the aluminum pieces 12*a* in the longitudinal direction on the flat surface may be 8 μm or more and 9 μm or less, and the average thickness of the aluminum pieces 12*a* may be 0.1 μm or more and 0.5 μm or less.

With such a configuration, in the coating film 10, the effect of improving electromagnetic wave permeability while maintaining dense and excellent metallic designability without feeling the particle feeling of the pigment (aluminum pieces 12*a*) is exhibited.

In the coating film 10 according to the present embodiment, the average thickness of the aluminum pieces 12*a* may be preferably more than 0.2 μm.

With such a configuration, in the coating film 10, the deformation of the pigment at the time of stirring the coating material is effectively suppressed, the contact between the aluminum pieces 12*a* adjacent to each other is suppressed to prevent an increase in attenuation rate, and the electromagnetic wave permeability can be further improved.

The coated article 1 according to the present embodiment includes the above-described coating film 10 and a substrate 20 made of a resin material and having the coating film 10 formed on an outer surface.

With such a configuration, since the coating film 10 having both metallic designability and electromagnetic wave permeability is formed on the outer surface of the resin material, the coated article 1 can be applied to, for example, a component required to have both metallic designability and electromagnetic wave permeability for accommodating a device transceiving electromagnetic waves or for covering and protecting at least a part of the periphery of the device.

The coated article 1 according to the present embodiment may be configured to be disposed to face the transceiver 110 of an electromagnetic wave W in the radar device 100 transceiving the electromagnetic wave W and measuring a physical quantity with respect to an object to be sensed at the front.

With such a configuration, when the coated article 1 is adopted as a bumper attached to the front or rear side of the vehicle, even if the radar device 100 is disposed on the rear side of the bumper, since the coated article 1 has both the metallic designability and the electromagnetic wave permeability, the designability of the vehicle can be improved without hindering the function of the radar device 100.

EXAMPLES

Hereinafter, the present invention will be more specifically described with reference to Examples, but the scope of the present invention is not limited to the following Examples.

Examples and Comparative Examples of the coated article 1 including the coating film 10 according to the embodiment of the present invention will be described.

[Preparation of Coating Material]

The method for preparing a coating material to be a coating film in each of Examples 1 to 7 and Comparative Examples 1 to 9 was adjusted as follows.

Examples 1 to 7

The coating materials used in Examples 1 to 7 were obtained by uniformly mixing the following materials and sufficiently stirring them with a disperser.

Raw Materials

- Resin material (PRO TOUCH BLENDING CLEAR, solid content 23%: manufactured by ROCK PAINT Co., Ltd.)
- Solvent (PRO TOUCH THINNER: manufactured by ROCK PAINT Co., Ltd.)
- Pigment A (GX-3109, solid content 74%: manufactured by Asahi Kasei Corp.)

Mixing Ratio

- Example 1 Resin material: 28 mass %, solvent: 70 mass %, pigment A: 2 mass %
- Example 2 Resin material: 28 mass %, solvent: 70 mass %, pigment A: 2 mass %
- Example 3 Resin material: 28 mass %, solvent: 70 mass %, pigment A: 2 mass %
- Example 4 Resin material: 28 mass %, solvent: 70 mass %, pigment A: 2 mass %
- Example 5 Resin material: 28 mass %, solvent: 70 mass %, pigment A: 2 mass %
- Example 6 Resin material: 25 mass %, solvent: 72 mass %, pigment A: 3 mass %
- Example 7 Resin material: 28 mass %, solvent: 70 mass %, pigment A: 2 mass %

Comparative Examples 1 to 9

The coating materials used in Comparative Examples 1 to 9 were obtained by uniformly mixing the following materials and sufficiently stirring them with a disperser.

Raw Materials

- Resin material (PRO TOUCH BLENDING CLEAR, solid content 23%: manufactured by ROCK PAINT Co., Ltd.)
- Solvent (PRO TOUCH THINNER: manufactured by ROCK PAINT Co., Ltd.)
- Pigment A (GX-3109, solid content 74%: manufactured by Asahi Kasei Corp.)
- Pigment B (GX-3160, solid content 74%: manufactured by Asahi Kasei Corp.)
- Pigment C (EMRS-910, solid content 10%: manufactured by Toyo Aluminium K.K.)
- Pigment D (EMR-DZ460, solid content 60%: manufactured by Toyo Aluminium K.K.)

Mixing Ratio

- Comparative Example 1 Resin material: 28 mass %, solvent: 70 mass %, pigment A: 2 mass %
- Comparative Example 2 Resin material: 25 mass %, solvent: 72 mass %, pigment A: 3 mass %
- Comparative Example 3 Resin material: 25 mass %, solvent: 72 mass %, pigment A: 3 mass %
- Comparative Example 4 Resin material: 96 mass %, solvent: 0 mass %, pigment B: 4 mass %
- Comparative Example 5 Resin material: 90 mass %, solvent: 4 mass %, pigment B: 5 mass %
- Comparative Example 6 Resin material: 87 mass %, solvent: 6 mass %, pigment B: 7 mass %
- Comparative Example 7 Resin material: 71 mass %, solvent: 0 mass %, pigment C: 29 mass %
- Comparative Example 8 Resin material: 84 mass %, solvent: 6 mass %, pigment D: 10 mass %
- Comparative Example 9 Resin material: 28 mass %, solvent: 70 mass %, pigment A: 2 mass %

[Production of Sample]

For each of samples of Examples 1 to 7 and Comparative Examples 1 to 9, first, a raw material obtained by mixing a polypropylene substrate (MX01HX: manufactured by SunAllomer Ltd., TET0CA129 2 wt % blended: manufactured by TOYOCOLOR CO., LTD.) as a substrate was injection-molded to prepare a black propylene flat plate of 150 mm×150 mm×3 mm. The coating film was obtained by spray-coating a conductive primer (PLYMAC No. 1501 (N6): manufactured by BASF Japan Ltd.) to the prepared substrate in a film thickness of 4 μm to 5 μm to form a primer layer, spray-coating a coating material adjusted for each sample on the surface of the primer layer by wet-on-wet to form a basecoat layer having a predetermined film thickness, further applying a two-liquid clear (MULTI-TOP CLEAR SF and MULTI-TOP S Curing Agent (both manufactured by ROCK PAINT Co., Ltd.) were mixed at a ratio of 2:1) to the surface of the basecoat layer by wet-on-wet to provide a setting time for 5 minutes, and then forcibly drying at 60°° C. for 35 minutes.

[Measurement Methods]

In Examples and Comparative Examples, constituent dimensions, ratios, and the like were measured by the following methods.

Area Occupancy Rate

The area occupancy rate of the aluminum pieces was obtained by forming a basecoat layer on a transparent polypropylene substrate under the film thickness conditions set in each of Examples and Comparative Examples, forming a topcoat layer on the basecoat layer, and then baking at 85° C. for 20 minutes, followed by photographing with transmission through an optical microscope at 500 times, and analyzing the obtained microphotograph with image analysis software "Microstudio".

Optical microscope: LEICA DMLM
Camera: WRAYMER VEX120
Image analysis software: Microstudio
Magnification: camera 0.63×2/3, objective 10×
Measurement section: region without pigment (aluminum piece)
Measurement method: An area of the same color was extracted on the basis of RGB at the selected position, counting was performed when the entire void position was selected, and the proportion was determined by (the number of counts/the total number of pixels)×100

Aluminum Major Diameter

The aluminum major diameter (the average major diameter of the aluminum pieces) was obtained by measuring the median diameter of the volume-based particle size distribution by a laser diffraction scattering method using a particle size distribution measuring apparatus.

Film Thickness of Basecoat Layer Film Thickness of Aluminum Piece

The film thickness of the basecoat layer and the thickness of the aluminum piece were obtained by observing TEM photographs of cross-sections of samples of Examples and Comparative Examples using a transmission electron microscope.

[Performance Evaluation]

The results of performance evaluation of Examples and Comparative Examples are shown in the following Tables 1 and 2.

TABLE 1

| | Example 1 | Example 2 | Example 3 | Example 4 | Example 5 | Example 6 | Example 7 |
|---|---|---|---|---|---|---|---|
| Area occupancy rate (%) | 77.0 | 82.5 | 89.9 | 95.5 | 99.5 | 100 | 100 |
| Aluminum major diameter (μm) | 9.0 | 9.0 | 9.0 | 9.0 | 9.0 | 9.0 | 9.0 |
| Aluminum thickness (μm) | 0.5 | 0.5 | 0.5 | 0.5 | 0.5 | 0.5 | 0.5 |
| Film thickness (μm) | 2.0 | 2.7 | 3.4 | 5.0 | 5.8 | 5.3 | 5.9 |
| P/B (aluminum pieces/resin) (%) | 28.1 | 28.1 | 28.1 | 28.1 | 28.1 | 42.2 | 56.2 |
| Attenuation rate (dB) | 0.5 | 0.63 | 0.7 | 0.84 | 0.91 | 1.68 | 2.88 |
| Luster (FF value) | 1.84 | 1.82 | 1.8 | 1.76 | 1.77 | 1.74 | 1.7 |

TABLE 2

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Area occupancy rate (%) | 70.0 | 100 | 100 | 89.0 | 95.0 | 99.5 | 100 | 100 | 100 |
| Aluminum major diameter (μm) | 9.0 | 9.0 | 9.0 | 15.0 | 15.0 | 15.0 | 11.0 | 10.0 | 9.0 |
| Aluminum thickness (μm) | 0.5 | 0.5 | 0.5 | 1.0 | 1.0 | 1.0 | 0.03 | 0.14 | 0.5 |
| Film thickness (μm) | 1.8 | 9.0 | 10.0 | 18.5 | 14.8 | 14.6 | 5.9 | 15.0 | 15.0 |
| P/B (aluminum pieces/resin) (%) | 28.1 | 42.2 | 42.2 | 12.6 | 18.9 | 25.2 | 17.6 | 30.0 | 28.1 |
| Attenuation rate (dB) | 0.56 | 3.0 | 3.42 | 1.5 | 2.5 | 4.07 | 4.0 | 2.6 | 2.04 |
| Luster (FF value) | 1.5 | 1.64 | 1.62 | 1.49 | 1.54 | 1.45 | 1.86 | 1.60 | 1.55 |

[Evaluation Index]

In the performance evaluation in Tables 1 and 2, the evaluation index of the electromagnetic wave permeability was set to "attenuation rate (dB)", and the evaluation index of the metallic designability was set to "luster (FF value)".

Attenuation Rate (dB)

For the attenuation rate, an electromagnetic wave of 76.5 GHz was made incident on each sample from a transmitter of a millimeter wave module (WR12-VNAX: Virginia Diodes, Inc.) at an incident angle of 0 degrees using an electromagnetic wave absorption measurement device (transmission attenuation rate measuring tool with a dielectric lens: manufactured by KEYCOM Corporation) in a room (temperature 26° C., humidity 60%), the electromagnetic wave transmitted through the sample was received by a receiver of the millimeter wave module facing the transmitter with the sample interposed therebetween, the transmission attenuation amount was measured with a network analyzer (N5222B: manufactured by Keysight Technologies), and then the value was doubled to obtain the attenuation rate based on the transmission attenuation amount of the reciprocating electromagnetic wave. For example, in a radar device mounted on a vehicle, when the attenuation rate is "3 dB or less", the radar device functions normally, and when the attenuation rate is "2 dB or less", more accurate measurement can be performed. The attenuation rate of "3 dB or less" is a value with which the rear side of the vehicle can be sensed by the radar device mounted on the vehicle, and the attenuation rate of "2 dB or less" is a value with which the front and lateral sides of the vehicle can be sensed. As described above, when the evaluation index of the electromagnetic wave permeability is "3 dB or less", the coating film can be evaluated to have sufficient performance as a product.

Luster

For the luster, an FF (Flip Flop) value was measured using a metallic feeling measuring apparatus (Alcope LMR-200: manufactured by Kansai Paint Co., Ltd.). The FF value is a numerical value of the degree of change in light intensity due to a difference in reflection angle with respect to incident light from a light source in a coating color of an automobile, and a larger FF value indicates that the brightness of the highlight and the shade is larger and the contrast is stronger, and when the FF value is "1.7 or more", the coating film can be evaluated to have favorable metallic designability.

[Results]

As shown in Table 1, In the samples of Examples 1 to 7, the area occupancy rate of the aluminum pieces was more than 75% and 100% or less, the average major diameter of the aluminum pieces was 9 μm or less, the film thickness of the basecoat layer was more than 2 μm and less than 9 μm, and the attenuation rate and the FF value satisfied the acceptance criteria for the evaluation index. This result indicates that "the area occupancy rate of the aluminum pieces is set to more than 75% and 100% or less", "the average major diameter of the aluminum pieces is set to 9 μm or less", and "the film thickness of the basecoat layer is set to more than 2 μm and less than 9 μm" are important factors for achieving both the electromagnetic wave permeability and the metallic designability in the coating film and the coated article including the coating film.

On the other hand, in Example 6, the P/B was 45% or less, and it was confirmed that the attenuation rate was lower and the luster was excellent as compared with Example 7 (P/B: 56.2%). This result indicates that "the P/B is set to 45% or less" is a factor for improving electromagnetic wave permeability and metallic designability in the coating film 10 and the coated article 1 including the coating film.

In both Example 4 and Example 5, the area occupancy rate was 99.5% or less, and it was confirmed that the attenuation rate was lower and the luster was excellent as compared with Example 6 (area occupancy rate: 100%). This result indicates that "the area occupancy rate is set to 99.5% or less" is a factor for improving electromagnetic wave permeability and metallic designability in the coating film 10 and the coated article 1 including the coating film.

In Examples 1 to 3, the area occupancy rate was 77% or more and 89.9% or less, the film thickness was 4 μm or less, and it was confirmed that the attenuation rate was lower and the luster was excellent as compared with Example 4. This result indicates that "the area occupancy rate is set to 77% or more and 89.9% or less" and "the film thickness is set to 4 μm or less" are factors for improving electromagnetic wave permeability and metallic designability in the coating film 10 and the coated article 1 including the coating film.

In all of Examples 1 to 7, the average thickness of the aluminum pieces was 0.5 μm, and the attenuation rate and the FF value satisfied the acceptance criteria for the evaluation index. This result indicates that "the average thickness of the aluminum pieces is 0.1 μm or more and 0.5 μm or less" is a factor for improving electromagnetic wave permeability while maintaining dense and excellent metallic designability without feeling the particle feeling of the pigment (aluminum pieces). The "average thickness of the aluminum pieces is more than 0.2 μm" indicates a factor for effectively suppressing the deformation of the pigment at the time of stirring the coating material and further improving the electromagnetic wave permeability.

As shown in Table 2, in Comparative Example 1, the area occupancy rate was 70%, the film thickness was 1.8 μm, and it was confirmed that the attenuation rate satisfied the criterion, but the luster did not satisfy the criterion. From this result, it is presumed that in Comparative Example 1, the film thickness was too thin to conceal the base layer, the lower layer was seen through, and the luster was reduced.

As shown in Table 2, in Comparative Example 2, the film thickness was 9.0 μm, and it was confirmed that the attenuation rate satisfied the criterion, but the luster did not satisfy the criterion. From this result, it is presumed that in Comparative Example 2, the film thickness was too thick so that the orientation of the aluminum pieces was disturbed and the luster was reduced.

As shown in Table 2, in Comparative Example 3, the film thickness was 10.0 μm, and it was confirmed that the attenuation rate and the luster did not satisfy the criteria. From this result, it is presumed that in Comparative Example 3, the film thickness was too thick, so that the attenuation rate was deteriorated, the orientation of the aluminum pieces was disturbed, and the luster was reduced.

As shown in Table 2, in Comparative Example 4, the average major diameter was 15.0 μm, the film thickness was 18.5 μm, the average thickness of the aluminum pieces was 1.0 μm, and it was confirmed that the attenuation rate satisfied the criterion, but the luster did not satisfy the criterion. From this result, it is presumed that in Comparative Example 4, the contact between the aluminum pieces adjacent to each other was suppressed due to the large film thickness, but the film thickness was too thick so that the orientation of the aluminum pieces was disturbed and the luster was reduced.

As shown in Table 2, in Comparative Example 5, the average major diameter was 15.0 μm, the film thickness was 14.8 μm, the average thickness of the aluminum pieces was 1.0 μm, and it was confirmed that the attenuation rate satisfied the criterion, but the luster did not satisfy the criterion. From this result, it is presumed that in Comparative Example 5, similarly to Comparative Example 4, the contact between the aluminum pieces adjacent to each other was suppressed due to the large film thickness, but the film thickness was too thick so that the orientation of the aluminum pieces was disturbed and the luster was reduced.

As shown in Table 2, in Comparative Example 6, the average major diameter was 15.0 μm, the film thickness was 14.6 μm, the average thickness of the aluminum pieces was 1.0 μm, and it was confirmed that the attenuation rate and the luster did not satisfy the criteria. From this result, it is presumed that in Comparative Example 6, the film thickness was too thick so that the orientation of the aluminum pieces was disturbed and the luster was reduced. In Comparative Example 6, since P/B is 25.5%, which is nearly twice as large as that in Comparative Example 4, it is presumed that the number of contact portions between the aluminum pieces adjacent to each other with disturbed orientation is increased to increase the dielectric constant, and as a result, the attenuation rate is deteriorated.

As shown in Table 2, in Comparative Example 7, the average major diameter was 11.0 μm, the average thickness of the aluminum pieces was 0.03 μm, and it was confirmed that the luster satisfied the criterion, but the attenuation rate did not satisfy the criterion. The coating material circulates while receiving pressure in the coating material pipe in order to suppress sedimentation of the pigment. In Comparative Example 7, since the average thickness of the aluminum pieces is 0.1 μm or less, it is presumed that stability during circulation is poor (the aluminum pieces are easily deformed), and the number of aluminum pieces per unit mass increases, so that the number of contact portions between the aluminum pieces adjacent to each other with disturbed orientation is increased to increase the dielectric constant, and the electromagnetic wave permeability is reduced.

As shown in Table 2, in Comparative Example 8, the film thickness was 10.0 μm, the average thickness of the aluminum pieces was 0.14 μm, and it was confirmed that the attenuation rate satisfied the criterion, but the luster did not satisfy the criterion. From this result, it is presumed that in Comparative Example 8, since the average thickness of the aluminum pieces was 0.1 μm or more, the electromagnetic wave permeability was secured due to the effect of achieving both the metallic designability and the electromagnetic wave permeability, but the film thickness was too thick, so than the orientation of the aluminum pieces was disturbed and the luster was reduced.

As shown in Table 2, in Comparative Example 9, the film thickness was 15.0 μm, and it was confirmed that the attenuation rate satisfied the criterion, but the luster did not satisfy the criterion. From this result, it is presumed that in Comparative Example 9, since the average thickness of the aluminum pieces was more than 0.2 μm, the electromagnetic wave permeability was excellent as compared with Comparative Example 8, but similarly to Comparative Example 8, the film thickness was too thick, so than the orientation of the aluminum pieces was disturbed and the luster was reduced.

REFERENCE SIGNS LIST

1 Coated article
10 Coating film
11 Primer layer
12 Basecoat layer (12*a* Aluminum piece)
13 Topcoat layer
20 Substrate
100 Radar device
110 Transceiver
W1 Transmission wave (electromagnetic wave)
W2 Reflected wave (electromagnetic wave)
X Object to be sensed

The invention claimed is:

1. A coated article comprising
a substrate made of a resin material; and
a coating film formed on an outer surface of the substrate and comprising:
a laminated structure including at least a basecoat layer containing a plurality of substantially flat aluminum pieces, wherein
an area occupancy rate of the aluminum pieces in the basecoat layer is more than 75% and 100% or less, an average length of the aluminum pieces in a longitudinal direction on a flat surface is 9 μm or less, a film thickness is more than 2 μm and less than 9 μm, and an average thickness of the aluminum pieces is more than 0.2 μm.

2. The coated article according to claim 1, wherein a content ratio of the aluminum pieces to a resin material in the basecoat layer is 45% or less.

3. The coated article according to claim 1, wherein the area occupancy rate of the aluminum pieces is 99.5% or less.

4. The coated article according to claim 1 wherein the area occupancy rate of the aluminum pieces is 77% or more and 89.9% or less.

5. The coated article according to claim 1, wherein the film thickness is 4 μm or less.

6. The coated article according to claim 1, wherein
the average length of the aluminum pieces in the longitudinal direction on the flat surface is 8 μm or more and 9 μm or less, and
the average thickness of the aluminum pieces is 0.5 μm or less.

7. The coated article according to claim 1, wherein the substrate is disposed to face a transceiver of an electromagnetic wave in a radar device transceiving the electromagnetic wave and measuring a physical quantity with respect to an object to be sensed at a front.

* * * * *